United States Patent Office 2,951,193
Patented Aug. 30, 1960

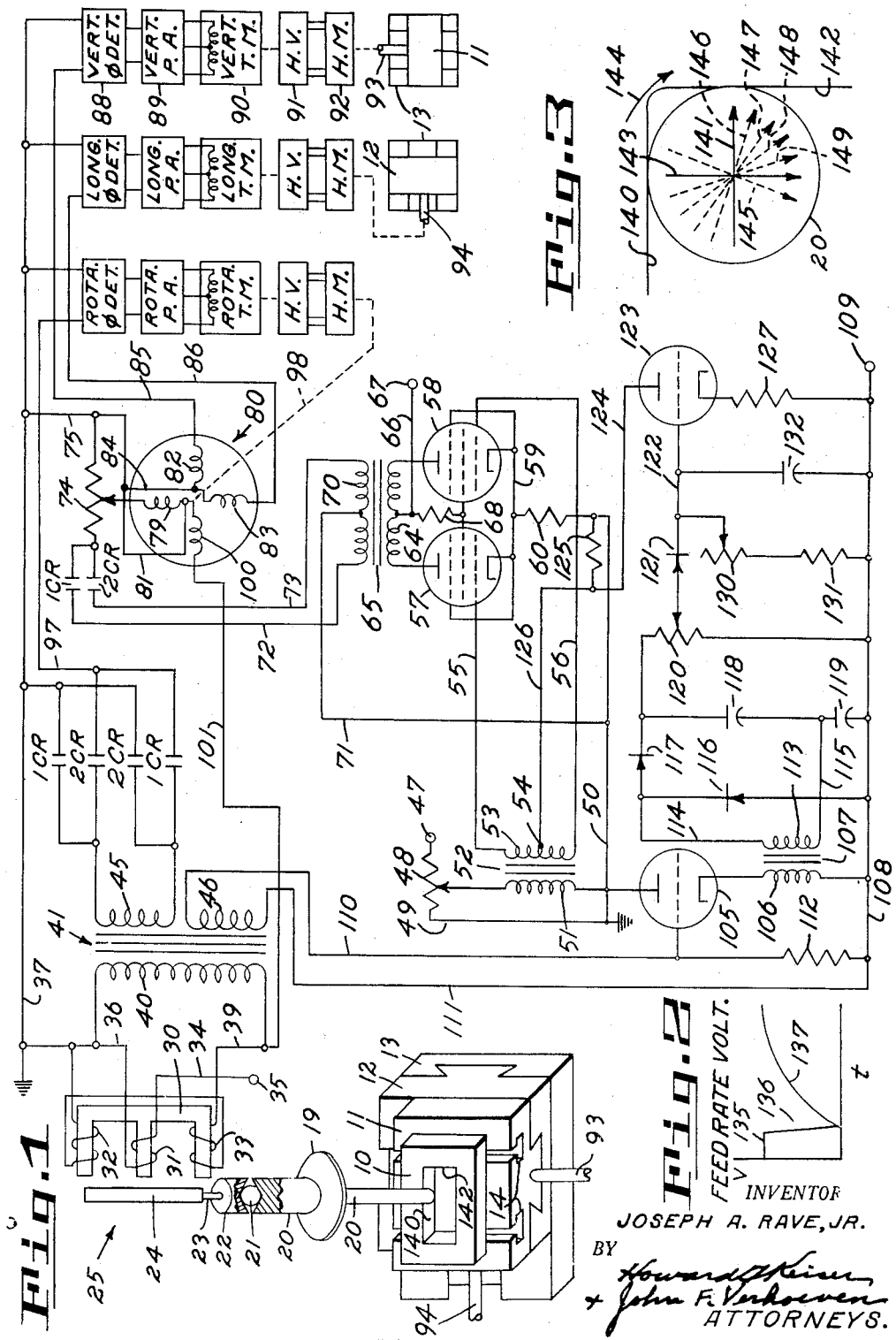

2,951,193

SLOWDOWN CONTROL FOR SERVOSYSTEM CIRCUIT

Joseph A. Rave, Jr., Cincinnati, Ohio, assignor to The Cincinnati Milling Machine Co., Cincinnati, Ohio, a corporation of Ohio Filed Apr. 16, 1958, Ser. No. 728,820

6 Claims. (Cl. 318—448)

This invention relates to a slowdown circuit for pattern controlled machines, and more particularly, to a form of a slowdown circuit in which the error signal from the tracer will act to immediately reduce the feed rate voltage and thereby slow down or stop the tracer, after which the feed rate voltage is returned to its normal value at a predetermined rate of increase.

In pattern controlled machines, it is usually desirable to incorporate a slowdown circuit in the tracer control mechanism which acts to reduce the feed rate of the tracer along the pattern whenever an abrupt change occurs in the pattern outline. This permits more accurate tracing of the pattern to be effected since it provides more time for the tracer to change its directional heading in accordance with the change in the pattern outline. Any abrupt change in the outline of the pattern, such as an inside or an outside corner, is sensed by the tracer which produces an error signal as it momentarily deviates from the contour of the pattern. It is convenient, therefore, to use the error signal as the means for providing a reduction in the feed rate whenever a sharp corner is encountered by the tracer.

In the prior art slowdown circuits, however, as soon as the error signal was reduced to zero as a result of the correction effected in response thereto, the full feed rate voltage was again applied to the servo motors which controlled the movement of the tracer along the pattern. This type of slowdown control is undesirable, however, in those types of tracing apparatus where the error signal is reduced to zero before the directional heading of the tracer has been fully corrected. In these types of apparatus when the conventional form of slowdown circuit is utilized, several false starts may be made during the rounding of the corner with accompanying violent oscillation of the slides before the directional heading is fully corrected.

The present invention is directed to an improved form of slowdown circuit in which the feed rate voltage, after being severely reduced in response to the occurrence of an error signal, is thereafter gradually restored to its original value at a predetermined rate so as to provide sufficient time for the steering mechanism to operate and fully correct the directional heading of the tracer before the full feed rate voltage is again applied to the servo motors which effect movement of the tracer relative to the pattern.

Accordingly, it is an object of the present invention to provide a slowdown circuit which operates to immediately reduce the feed rate voltage upon the occurrence of an error signal but which limits the rate at which the feed rate voltage is restored to its original value.

Another object of the present invention is to provide, in an electrically controlled tracing apparatus, a slowdown circuit which includes an integration circuit for limiting the rate at which the feed rate voltage is returned to its initial value.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

Fig. 1 is a diagrammatic view of a tracing apparatus incorporating the novel slowdown circuit of the present invention.

Fig. 2 is a graph illustrating the effect of the slowdown circuit on the feed rate voltage.

Fig. 3 is a schematic view which illustrates the operation of the system shown in Fig. 1 during tracing of a pattern.

Similar reference characters designate similar or identical elements and portions throughout the specification and throughout the different views of the drawings.

In Fig. 1 is schematically shown the essential elements of one form of pattern tracing apparatus to which the present invention may be successfully applied. A more detailed showing of the tracing system as applied to a milling machine structure is contained in patent application, Serial No. 728,972, filed April 16, 1958, for Pattern Controlled Milling Machine, by Herbert M. Fuldner et al. As herein shown, a pattern 10 is supported for relative movement in either of two mutually perpendicular directions by slides 11 and 12 which are supported on a base 13 of the tracing machine or apparatus. The slide 12, hereinafter referred to as the longitudinal slide, is guided for rectilinear sliding movement either to the left or to the right on the base 13 while the slide 11, hereinafter referred to as the vertical slide, is suitably supported for rectilinear sliding movement on the slide 12 in a fore and aft direction. The pattern 10 may be rigidly clamped to the upper face of the slide 11 by means of suitable clamping bolts (not shown) inserted in T-slots 14 provide in the slide.

By suitably coordinating the movement of the two slides, the pattern may be given 360 degrees of movement relative to a tracing stylus 20 which may be supported on a ring 19 for universal pivoting movement about a point intermediate its ends. Accordingly, lateral deflection of the lower end of the stylus in any direction will cause a ball 21 mounted in a conical recess provided in the upper end of the stylus to cam upwardly a plunger 22 having a similar conical recess formed in the lower end thereof. The plunger 22 is understood to be supported for axial sliding movement and is connected by a stem 23 with an armature 24 of a differential transformer 25. Means is conventionally provided for biasing the plunger 22 downwardly to thereby center the ball 21 in the conical recesses at which time the armature 24 will be displaced somewhat below its electrically neutral position. Thus, the "hang-free" position of the stylus 20 represents an underdeflected condition of the tracer, and a slight sidewise deflection of the stylus is necessary in order to bring the differential transformer to a null condition. If the stylus is given a deflection in excess of this "normal" deflection, the armature will be raised above the null position, and an over-deflected signal will be produced. In the arrangement herein shown, it will be understood that the tracing head, including the stylus 20 and the differential transformer 25, is mounted on a portion of the machine which is stationary with respect to the base 13.

The differential transformer 25 is of conventional design and includes an E-shaped core 30 on the center leg of which is wound a primary coil 31 and on the outer legs of which are wound secondary coils 32 and 33. The primary coil 31 is energized with alternating current of a suitable frequency which may, for example, be in the neighborhood of 400 cycles per second. The primary coil is connected to this source by a lead 34 connected to a terminal 35 to which the current from the A.C. source is applied. The other end of the primary coil is connected by a lead 36 to a ground wire 37, it being understood that one side of the A.C. source is likewise grounded. The secondary coils 32 and 33 are connected in phase opposition with one end grounded and the other end connected by a lead 39 with the primary winding 40 of a transformer 41. The other end of the primary winding 40 is connected to the ground lead 36 to thereby provide a conducting path for the error signal derived from the secondary windings of the differential transformer through the primary winding 40 of the transformer.

The transformer 41 is provided with two secondary windings 45 and 46, the former being utilized to apply the error signal to a rotation servomechanism while the latter winding is utilized to apply the error signal to the slowdown circuit to effect suitable control of a feed rate voltage for the slides.

A source of feed rate voltage, which may be the same A.C. source as is connected to the terminal 35, is applied to a terminal 47 to which is connected one end of a potentiometer 48, the other end of which is connected by a lead 49 with a grounded conductor 50. The potentiometer 48 provides a means for adjusting the feed rate of the slides to a suitable value for the particular type of tracing operation being performed. The slider of the potentiometer is connected to one end of a primary winding 51 of a transformer 52. The other end of the primary winding 51 is connected to the grounded conductor 50. The transformer 52 is also provided with a secondary winding 53 having a center tap 54. The ends of the secondary winding are connected by leads 55 and 56 to the grids of a pair of vacuum tubes 57 and 58. The grids are thereby driven in phase opposition to provide push-pull operation of the amplifier circuit comprised of tubes 57 and 58. The cathodes of the tubes are connected together by a lead 59 which, in turn, is connected by a cathode biasing resistor 60 to the grounded conductor 50. The plates of the tubes are supplied with a positive D.C. potential through the center tap of a winding 64 on a transformer 65. The center tap of the winding 64 is connected by a conductor 66 to a terminal 67 to which is connected a source of positive D.C. potential which may, for example, be in the order of 250 v. D.C. The screen grids of the tubes are provided with a suitable positive D.C. potential by means of a resistor 68 connected between the screen grids and the conductor 66. The transformer 65 is also provided with a center tapped secondary winding 70, the center tap being grounded by a lead 71 which is connected to the conductor 50. Hence, the amplified feed rate voltage derived from the A.C. source connected to the terminal 47 appears across each half of the secondary winding 70, the phase of this voltage in one-half of the winding being 180 degrees out of phase with the voltage appearing across the other half of the winding as seen from the grounded center tap. Therefore, leads 72 and 73 which are connected to the opposite ends of the secondary winding 70 each carry the amplified feed rate voltage, but the voltage in one is 180 degrees out of phase with respect to the voltage in the other.

Either lead 72 or 73 may be connected by the normally open relay contacts of relays 1CR and 2CR with one end of a potentiometer 74, the other end of which is connected by a lead 75 with the ground wire 37.

The amplified feed rate voltage is applied to a winding 79 on the rotor of a resolver 80, one end of the winding being connected to the slider of potentiometer 74 while the other end is connected to a lead 81 which is connected to the grounded end of the potentiometer. The resolver 80 is provided with a pair of stator windings 82 and 83 which are located at right angles to one another and each of which has one end connected to ground by a lead 84. The other end of winding 82 is connected by a lead 85 to the input of a servo amplifier for the vertical slide 11 while the other end of winding 83 is connected by a lead 86 with the servo amplifier for the longitudinal slide 12. In each case the servoamplifier comprises a phase detector 88 which senses the phase of the input voltage with respect to the reference source, and delivers a plus or minus D.C. voltage to a power amplifier 89. The output of the power amplifier is applied to a torque motor 90 which actuates a hydraulic valve 91 and thereby controls the rate and direction of operation of a hydraulic servomotor 92. A driving connection 93 is provided from the motor to the vertical slide 11 so that the slide will be caused to move in response to the phase and amplitude of the input signal applied to the servo amplifier by way of lead 85. The longitudinal slide 12 is controlled by a similar servomechanism comprised of components similar to those just described in connection with the vertical slide, a driving connection 94 being provided between the hydraulic motor and the slide. Hence, the longitudinal slide 12 will move in response to the phase and amplitude of the input signal applied via lead 86. Since the feed rate voltage derived from the slider of potentiometer 74 is fed to the rotor winding 79 of the resolver, and since the output windings 82 and 83 of the resolver are displaced 90 degrees with respect to one another, the feed rate voltage components appearing in the two output windings will always bear sine-cosine relationship, and the slides will move at speeds proportional thereto. Hence, the resultant motion of the pattern relative to the stylus 20 will correspond to the vector sum of the sine and cosine components and will remain constant for a given feed rate voltage applied to the winding 79. The tracer will, therefore, always move at a constant feed rate relative to the pattern regardless of the directional heading of the tracer relative to the pattern.

Error signals produced by the differential transformer 25 resulting from an overdeflection or underdeflection of the tracer stylus, and which appear across the secondary winding 45 of the transformer 41, are applied by means of relay contacts 1CR or 2CR to a lead 97 connected to the input of the servoamplifier for the rotation servomotor. Thus, when the contacts 1CR are closed, the lower end of winding 45 will be connected to the lead 97 whereas the upper end of the winding will be connected to the ground wire 37. Alternatively, when the contacts 2CR are closed, the upper end of the winding 45 will be connected to the lead 97 while the lower end thereof will be connected to ground. It is thereby possible to reverse the sense of the signals applied to the rotation servomotor and so reverse its direction of rotation. It will be recalled that the leads 72 and 73 for the amplified feed rate voltage are also alternately connected to the potentiometer 74 by relay contacts 1CR and 2CR. Hence, the direction of movement of the slide will be reversed simultaneously with a reversal in the diretcion of rotation of the rotation servomotor. Therefore, the direction of tracing around the pattern outline may be reversed from clockwise to counterclockwise or vice versa by suitable energization of relay 1CR or 2CR. These relays and their energizing circuits are not shown herein since these do not form a part of the present invention.

The rotation servomechanism comprises the same elements as those described in connection with the servomechanism for the vertical slide 11, namely, a phase detector, a power amplifier, a torque motor, a hydraulic valve, and a hydraulic servomotor controlled by the valve which is provided with a mechanical driving connection 98 to the rotor of the resolver 80. Hence, when the tracer stylus is moved by the pattern to an overdeflected or underdeflected position, the error signal produced thereby will cause rotation of the resolver in the appropriate direction to change the directional heading of the pattern relative to the tracer to return the tracer stylus to its position of normal deflection.

The rotor of the resolver is provided with a second winding 100 disposed at right angles to the winding 79 and which has one end connected to the ground lead 81, and the other end connected to a lead 101 which connects to the output lead 39 of the differential transformer. Hence, the error signals produced by the differential transformer will be applied to the quadrature winding 100 and thereby introduce quadrature components into the output windings 82 and 83 to produce a resultant motion of the slides at right angles to that produced by the voltage from the feed rate winding 79. The voltage applied to the quadrature winding 100 will therefore produce movement of the slides which is such as to move the pattern toward or away from the stylus 20 at right angles to the direction of tracing. The underdeflection or overdeflection of the tracing stylus will thereby immediately be corrected to return the stylus to its position of normal deflection independently of the correction effected by rotation of the resolver to correct the directional heading of the slides.

The slowdown circuit which comprises the novel subject matter of the present invention is shown in the bottom portion of Fig. 1 and includes a vacuum tube 105 having its plate connected to the grounded conductor 50 and its cathode connected through the primary winding 106 of a transformer 107 to a conductor 108. The conductor 108 is connected with a source of negative D.C. potential by means of a terminal 109. The voltage applied to the terminal 109 by the negative voltage source may be in the nature of 125 volts negative with respect to ground. The grid of tube 105 is connected by a lead 110 with one terminal of secondary winding 46 while the other end of this winding is connected by a lead 111 with the negative voltage supply lead 108. A grid resistor 112 is connected between the grid of the tube and the conductor 108. The tube is thereby connected as a cathode follower and the signal developed across the primary winding 106 will produce an output signal in a secondary winding 113 of the transformer 107. A bias voltage for the tube 105 is provided by the voltage drop across the primary winding 106 which has sufficient D.C. resistance to provide the proper bias for the tube.

The error signal appearing across the secondary winding 113 is conducted by leads 114 and 115 to a voltage doubler type rectifying circuit of conventional design and which includes diode rectifiers 116 and 117 and condensers 118 and 119. This circuit provides rectification of the error signal and the output thereof is applied across the winding of a potentiometer 120. A portion of the rectified output is tapped off the potentiometer by the slider thereof which is connected by a diode 121 and a lead 122 with the grid of a bias tube 123. The cathode of this tube is connected by a resistor 127 to the conductor 108, while the plate thereof is connected by a lead 124 and a load resistor 125 to the grounded conductor 50. The plate lead 124 is also connected by a lead 126 with the center tap 54 of the transformer secondary winding 53. It will be recalled that the ends of the secondary winding 53 are connected to the grids of the push-pull amplifier tubes 57 and 58 so that the lead 126 provides a means for injecting a bias voltage onto the grids of the tubes 57 and 58.

For the purposes of the present invention an integration circuit is connected to the grid of tube 123, this circuit comprising potentiometer 130, resistor 131, and condenser 132. As shown, the condenser 132 is connected directly from the grid lead 122 to the negative voltage supply conductor 108 while the potentiometer 130 and resistor 131 provide a shunt path from lead 122 to conductor 108.

When the tracer stylus 20 is in its position of normal deflection, the differential transformer will be at a null and zero output signal will be applied to the amplifier tube 105. Since there is no A.C. signal applied to the grid of tube 105, there will be no output signal induced in the secondary of transformer 107. Hence, the grid of tube 123 will be at the same potential as the conductor 108 while the cathode of the tube will be biased positive by the voltage drop across the cathode resistor 127. Since this voltage drop is relatively large, the tube 123 will be biased almost to cutoff, and the current flowing through the tube and through the load resistor 125 will be very small. Hence, the drop across resistor 125 will be small, and the center tap 54 will be held at approximately ground potential. Hence, the grids of tubes 57 and 58 likewise will be at approximately ground potential, whereas the cathodes of the tubes will be somewhat more positive due to the voltage drop across the cathode resistor 60. At this time also, the condenser 132 will be discharged since lead 122 is at the same potential as conductor 108.

When an error signal of substantial proportions is applied to the grid of tube 105, an A.C. voltage will be induced in the secondary of transformer 107 and will be rectified and doubled by the voltage doubler circuit. A positive D.C. voltage will thereby be applied to the upper end of potentiometer 120, and a suitable portion of this voltage will be tapped off by the slider and delivered through the diode 121 to the grid of tube 123. The condenser 132 will be very rapidly charged since the resistance of the charging circuit is relatively low. The positive potential applied to the grid of tube 123 will cause it to conduct, thereby creating a voltage drop across the load resistor 125 which is applied by lead 126 as a negative bias to the grids of tubes 57 and 58. The negative bias thus applied to the grids is sufficient to cut off the current flow through the tubes when the error signal is large. Hence, the feed rate voltage applied to the resolver winding 79 will be reduced to zero, and movement of the slides in the tracing direction will be stopped.

Assuming that the error signal is now reduced to zero, the voltage appearing across secondary winding 113 of transformer 107 will likewise be reduced to zero as will also the D.C. potential across the potentiometer winding 120. However, since the condenser 132 is charged and since the diode 121 is poled to prevent reverse flow of current from lead 122 through potentiometer winding 120 to conductor 108, the only path provided for discharge of the current stored in condenser 132 is through the potentiometer winding 130 and resistor 131. Hence, the tube 123 will remain conducting until the charge on condenser 132 has been dissipated through the high resistance path provided by the potentiometer 130 and resistor 131. Hence, the tubes 57 and 58 will be returned to their normal conducting state in a gradual manner, and the feed rate voltage applied to coil 79 of the resolver will be likewise gradually restored to normal. The time constant of the integration circuit provided by condenser 132, potentiometer 130 and resistor 131 may be adjusted within limits by the setting of the potentiometer slider. The time constant of the circuit and its range of adjustment will, of course, depend upon the characteristics of the tracer apparatus and may vary from a fraction of a second to several seconds for most applications.

In the case of error signals of smaller amplitude which are insufficient to bias the tubes 57 and 58 all the way to cut-off, the feed rate voltage will be substantially reduced and gradually reapplied to the slides so as to improve the accuracy of tracing. It is to be noted also, that the error signal as applied to the rotation amplifier and to the quadrature winding 100 on the resolver is in no way reduced or affected by the present slowdown circuit so that rotation and quadrature remain fully effective to correct the tracing error sensed by the stylus.

The effect of the integration circuit upon the feed rate voltage is indicated by the graph in Fig. 2. The curve shown in this Figure represents the changes which occur in the amplitude of the feed rate voltage at the time of and immediately after the occurence of a large error signal. The normal or initial value of the feed rate voltage is represented by the horizontal line 135 which continues in a horizontal direction to the right until a large error signal occurs, whereupon the feed rate voltage is rapidly reduced to zero as indicated by the line 136. If the error signal is now reduced to zero, the feed rate voltage will be returned by the integration circuit to its normal value along the exponential curve represented by the portion 137 of the curve until it is again at its normal value.

In Fig. 3 is shown a schematic representation of the tracer stylus 20 as it engages an inside corner of the pattern 10 while tracing from left to right as viewed in Figs. 1 and 3. The relative movement of the stylus and pattern in the tracing direction as it moves along the inside edge 140 of the pattern is represented by the solid arrow 141 in Fig. 3. When the stylus strikes the edge 142 of the pattern, a large error signal will be produced which will, as previously described, reduce the feed rate to zero. At the same time, the error signal will energize the rotation servomechanism and cause the resolver 80 to be rotated in the direction shown by the curved arrow 144. Also, the quadrature voltage will be effective to move the stylus relative to the pattern approximately in the direction represented by the dotted arrow 145 which is at right angles to the direction of tracing. This will cause the stylus to move away from the side wall 142 and reduce the error signal to zero. Were it not for the integration circuit which has been provided in the present slowdown circuit, the feed rate voltage would immediately be reapplied to the slides, and the stylus would be moved in the direction of the dotted arrow 146 and cause it to reengage the edge 142 of the pattern and produce another large error signal. Further rotation of the resolver would then take place in the direction of the arrow 144, the error signal would again be returned to zero, and the feed rate voltage would again move the stylus against the edge 142 of the pattern in the direction of the arrow 147. This action would continue as represented by the arrows 148 and 149 until the directional heading is finally fully corrected as represented by the solid arrow 143, whereupon the stylus would trace downwardly along the edge 142 in a normal fashion. Thus, a number of false starts would be made by the tracer before the directional heading was fully corrected. Such action is undesirable inasmuch as it results in oscillation of the slides with consequent poor surface finish of the work in the vicinity of the corner.

With the integration circuit previously described, however, this undesirable effect is avoided since reapplication of the feed rate voltage in full measure is prevented until the steering mechanism represented by the resolver 80 has had time to fully correct the directional heading of the stylus relative to the pattern so that smooth tracing of the pattern is effected in the corner. It will be appreciated that as the feed rate voltage is gradually returned to normal along the exponential curve represented by reference numeral 137 in Fig. 2, a gentle pressure is applied to the stylus 20 by the edge 142 of the pattern which maintains the error signal and causes rotation of the resolver in the direction of the arrow 144. By the time the resolver has rotated through a full 90 degrees in the example herein illustrated, the feed rate voltage will be approaching its normal value since the condenser 132 will now be almost completely discharged, and the bias on tubes 57 and 58 will now be reduced to approximately its initial value. Tracing of the pattern will then be resumed in a normal manner until the next corner is encountered whereupon the operation previously described will be repeated.

It will be appreciated from the foregoing disclosure that the potentiometer 120 provides control of slowdown sensitivity, i.e., the size of the error signal which is required to bias the tubes 57 and 58 to cutoff, while the potentiometer 130 provides control over the time required for the feed rate voltage to return to approximately its normal value after the error signal has been removed. It is also to be noted that in the foregoing description of my invention it is my intention to cover all changes and modifications of the embodiment of the invention herein disclosed which do not constitute departures from the spirit and scope of the invention.

What is claimed is:

1. In an electrically controlled pattern tracing apparatus having a tracer, a source of feed rate voltage of predetermined amplitude, means for translating the tracer along a pattern at a rate proportional to the amplitude of the feed rate voltage, and means for producing an error signal whenever the tracer departs from the outline of the pattern being traced, the invention comprising means for producing a control voltage which is substantially proportional to the amplitude of the error signal, means for causing the feed rate voltage to be reduced from said predetermined amplitude as the control voltage increases and to be returned to said predetermined amplitude as the control voltage decreases, and means for controlling the rate of decrease of said control voltage after the error signal is removed to thereby limit the rate at which the feed rate voltage is returned to said predetermined amplitude.

2. The electrically controlled pattern tracing apparatus of claim 1 wherein said last-recited means includes an integration circuit.

3. In an electrically controlled pattern tracing apparatus having a tracer, a source of feed rate voltage of predetermined amplitude, means for translating the tracer along a pattern at a rate proportional to the amplitude of the feed rate voltage, and means for producing an error signal whenever the tracer departs from the outline of the pattern being traced, the invention comprising means for producing a bias voltage which is substantially proportional to the amplitude of the error signal, electronic control means for causing the feed rate voltage to be reduced from said predetermined amplitude as the bias voltage increases and to be returned to said predetermined amplitude as the bias voltage decreases, and an integration circuit for controlling the rate of decrease of said bias voltage after the error signal is removed to thereby limit the rate at which the feed rate voltage is returned to said predetermined amplitude.

4. In a slowdown circuit for reducing the amplitude of a feed rate voltage from a predetermined value as an error signal increases and vice versa, the invention comprising means for producing a control voltage which is substantially proportional to the amplitude of the error signal, means for causing the feed rate voltage to be reduced from said predetermined value as the control voltage increases and to be returned to said predetermined value as the control voltage decreases, and means for controlling the rate of decrease of said control voltage after the error signal is removed to thereby limit the rate at which the feed rate voltage is returned to said predetermined value.

5. The slowdown circuit of claim 4 wherein said last recited means includes an integration circuit.

6. In a slowdown circuit for reducing the amplitude of a feed rate voltage from a predetermined value as an error signal increases and vice versa, the invention comprising means for producing a bias voltage which is substantially proportional to the amplitude of the error signal, electronic control means for causing the feed rate voltage to be reduced from said predetermined value as the bias voltage increases and to be returned to said predetermined value as the bias voltage decreases, and an integration circuit for controlling the rate of decrease of said bias voltage after the error signal is removed to thereby limit the rate at which the feed rate voltage is returned to said predetermined value.

References Cited in the file of this patent

UNITED STATES PATENTS

| | | |
|---|---|---|
| 2,492,731 | Bronson | Dec. 27, 1949 |
| 2,837,707 | Stokes | June 3, 1958 |